US006984448B1

(12) United States Patent
Davies et al.

(10) Patent No.: US 6,984,448 B1
(45) Date of Patent: Jan. 10, 2006

(54) CUBIC BORON NITRIDE CLUSTERS

(76) Inventors: Geoffrey John Davies, 36 Boundary Road, Linden Ext., Randburg (ZA) 2194; Raymond Albert Chapman, 183 Columbine Avenue, Mondeor (ZA) 2091; Lesley Kay Hedges, 4 Oriole Mews, Delphinium Street, Brackenhurst (ZA) 1448; Aulette Stewart, 22 Nicolyn Avenue, Ruiterhof, Randburg (ZA) 2194; Bronwyn Annette Roberts, 94 18th Street, Parkhurst (ZA) 2193

( * ) Notice: Subject to any disclaimer, the term of this patent is extended or adjusted under 35 U.S.C. 154(b) by 409 days.

(21) Appl. No.: 10/129,959

(22) PCT Filed: Nov. 17, 2000

(86) PCT No.: PCT/IB00/01691

§ 371 (c)(1),
(2), (4) Date: Oct. 17, 2002

(87) PCT Pub. No.: WO01/36081

PCT Pub. Date: May 25, 2001

(30) Foreign Application Priority Data

Nov. 19, 1999 (ZA) .................................... 99/7209
Jan. 18, 2000 (ZA) .................................. 2000/0198

(51) Int. Cl.
*C30B 23/00* (2006.01)
*B32B 18/00* (2006.01)
*C01B 21/064* (2006.01)
(52) U.S. Cl. ....................... 428/402; 117/109; 423/290
(58) Field of Classification Search ................ 117/109; 423/290; 428/402
See application file for complete search history.

(56) References Cited

U.S. PATENT DOCUMENTS

| 3,212,852 | A | * | 10/1965 | Bundy ......................... 423/290 |
| 4,188,194 | A | * | 2/1980 | Corrigan ....................... 51/307 |
| 4,699,687 | A | | 10/1987 | Yazu et al. ................... 423/210 |
| 4,883,648 | A | | 11/1989 | Davies et al. ................ 423/290 |
| 5,985,228 | A | * | 11/1999 | Corrigan et al. ............. 423/290 |

OTHER PUBLICATIONS

M.M. Bindal et al.: "Synthesis of cubic boron nitride using magnesium as the catalyst" Journal of Crystal Growth, vol. 112, No. 2 / 03, pp. 386-401 Jun. 1, 1991.
O. Mishima et al.: "Crystal growth of cubic boron nitride by temperature difference method at 55 kbar and 1800 deg c" Journal of Applied Physics, vol. 61, No. 8, part 01, pp. 2822-2825 Apr. 15, 1987.
G. Nover et al.: "High pressure phase transformations of cubic boron nitride from amorphous boron nitride using magnesium boron nitride as the catalyst" Journal of Crystal Growth, vol 152 No. 3 pp. 143-149, (no date).

* cited by examiner

*Primary Examiner*—Wayne A. Langel
(74) *Attorney, Agent, or Firm*—Oblon, Spivak, McClelland, Maier & Neustadt, P.C.

(57) ABSTRACT

A cubic boron nitride cluster comprises a core (10) and an overgrown region, the overgrown region containing a plurality of cubic boron nitride crystallites (12) extending outwards from the core (10). The majority of the cubic boron nitride crystallites (12) have a cross-sectional area which increases as the distance from the core (10) increases. A method of producing cubic boron nitride clusters is also provided.

14 Claims, 2 Drawing Sheets

CUBIC BORON NITRIDE CLUSTERS

BACKGROUND OF THE INVENTION

This invention relates to the growth of cubic boron nitride (CBN) crystals as clusters of crystals.

The use of seeds to control crystallisation by controlling the number of nucleation sites is well known in the art of crystal growing. In the case of cubic boron nitride synthesis, small cubic boron nitride particles may be used as seeds to promote the preference of crystal growth on the seeds rather than crystal growth by spontaneous nucleation. For such applications, it is desirable to ensure that the seeds have a known size distribution, so that numbers of seeds can be controlled, and that the seeds are distributed evenly and discretely.

Generally, in the art of growing cubic boron nitride crystals by high pressure, high temperature (HPHT) synthesis, the seeds may be cubic boron nitride particles which are single crystals selected on the basis of size alone. Such seeds are usually made by crushing larger cubic boron nitride crystals or may be as-grown cubic boron nitride crystals, and the cubic boron nitride crystals grown using these seeds are dominated overwhelmingly by single crystals. A method of growing cubic boron nitride crystals uses the difference in solubility between hexagonal boron nitride and cubic boron nitride under the same conditions of pressure and temperature as the driving force for crystallisation.

This method is otherwise known as the allotropic change method. Other methods of generating supersaturation are known in the art. Generally, the objective of such cubic boron nitride growth is to maximise the proportion of individual and discrete crystals, and to minimise the proportion of clusters containing a plurality of crystals. Such clusters, when they occur, may be due to secondary nucleation on the surface of growing crystals, or may be due to the accidental proximity of two or more seeds and/or growing crystals.

SUMMARY OF THE INVENTION

According to the present invention, a method of growing cubic boron nitride clusters includes the steps of providing a source of boron and nitrogen, providing a plurality of growth centre particles, each comprising a bonded mass of constituent particles, producing a reaction mass by bringing the source of boron and nitrogen and growth centre particles into contact with a crystallisation agent, subjecting the reaction mass to conditions of elevated temperature and pressure suitable for crystal growth, allowing sufficient time for crystal growth to occur and recovering the cubic boron nitride crystal clusters from the reaction mass.

The growth centre particle will provide a number of nucleation sites which may be randomly oriented by virtue of its structure and the initial crystals that grow will exhibit a variety of crystallographic directions depending upon the growth centre's structure. Some of these crystals will be oriented so that they grow in the fastest growing direction, whilst other crystals will grow more slowly. Depending upon the number of nucleation sites in the growth centre, the degree of interference of adjacent growing crystals and their growth directions, the growth of some crystals will be terminated early whilst others will continue growing. This will result in a crystal cluster whose structure is related to the structure of the original growth centre. Furthermore, when the constituent particles comprising the growth centre particle have twin planes, the resultant grown crystal cluster will comprise crystallographically twinned crystals. Moreover, the twinning structure of the growth centre particle may contribute to faster growth in particular crystallographic directions and so play a role in the selection of terminated crystals and those that continue to grow.

Thus, it has been found that the method of the invention produces clusters of cubic boron nitride crystals, with the number of crystals comprising the cluster ranging from a few crystals to several hundred crystals, or more. The cubic boron nitride cluster comprises a core and an overgrown region, the overgrown region containing a plurality of cubic boron nitride crystallites extending outwards from the core, the majority of the crystallites having a cross-sectional area which increases as the distance of the crystallite from the core increases. Such clusters are believed to be new and form another aspect of the invention. The crystallites of the clusters are generally substantially faceted and substantially free of crystallisation agent. Such clusters may be made up of predominantly single crystals, or predominantly twinned crystals. Generally, at least 80% of the crystallites have a cross-sectional area which increases as the distance of the crystallite from the core increases.

It is possible by appropriate selection of the growth centre particles to produce clusters of selected and controlled or tailored structure, including clusters with significant aspect ratios.

The clusters may be used in abrasive particle applications such as grinding, sawing, cutting, turning, milling, drilling, boring or polishing. Clusters will have better bond retention and/or free cutting properties than other conventional cubic boron nitride abrasives.

Claddings or coatings may be applied to clusters to further enhance their utility in particular applications.

DESCRIPTION OF EMBODIMENTS

Figure 1A:
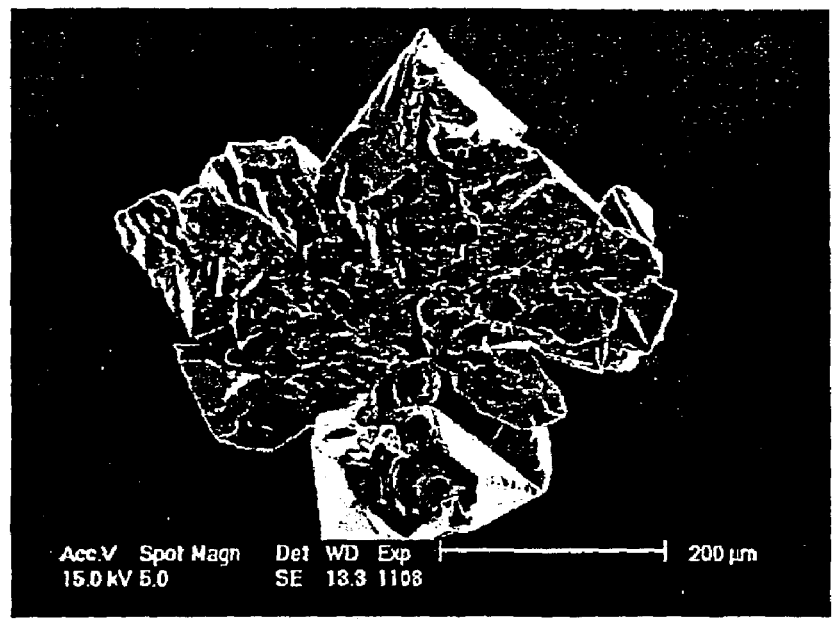
FIG. 1a is a secondary micrograph of a fractured cubic boron nitride cluster at a magnification of about ×135.

The source of boron and nitrogen may be a single source or a mixture of sources. In the case of a single source of boron and nitrogen, the source may be any non-cubic form of boron nitride such as hexagonal boron nitride or any other boron nitride known in the art of cubic boron nitride synthesis. In the case of a mixture of sources of boron and nitrogen, the source may be a mixture of the aforesaid sources, a mixture of magnesium boride and magnesium nitride, a mixture of other suitable nitrides and borides, or a combination of these or any other suitable source of boron or nitrogen.

The growth centres may be derived from CVD cubic boron nitride, shock wave produced cubic boron nitride, HPHT cubic boron nitride, or polycrystalline cubic boron nitride (PCBN). Growth centre particles being a bonded mass of constituent cubic boron nitride particles provide a multiplicity of nucleation sites, the number of which are controlled by the selection of a suitable combination of constituent particle size range and growth centre size range. The constituent particles of the growth centre may be randomly oriented crystallographically. The constituent particles may be of any suitable size, but typically, will have a size of less than 200 microns. The growth centre particles may be of any size, but typically, will have a size less than 1 millimeter.

The bonding in the growth centre particles is such as to create a relationship, generally a predetermined relationship, between individual constituent particles. The bonding may be self-bonding between constituent particles or by means of a bonding agent which may be organic or inorganic.

Growth centre particles from CVD cubic boron nitride may be provided by crushing CVD film and screening to a suitable size range. The crushed CVD particles may be agglomerated to form the growth centre using a suitable binder. The size of the growth centre may be controlled by a suitable sizing technique, such as sieving. The constituent CVD particles contain a plurality of twin planes, the average spatial density of which depends upon the nature of the CVD film from which they are derived. Hence, the growth centre particle will contain a multiplicity of constituent particles with a multiplicity of twin planes.

Growth centres from HPHT cubic boron nitride may be provided by selecting a suitable size fraction of cubic boron nitride particles, granulating the cubic boron nitride using a suitable binder, and producing a suitable size range of growth centre particles by a suitable sizing technique, such as sieving.

Growth centre particles of polycrystalline cubic boron nitride (PCBN), may be provided by selecting a PCBN of suitable grain size, and crushing to a suitable size range. Growth centre particles of this type will contain a multiplicity of constituent particles (grains), a proportion of which may be microtwinned.

Growth centre particles may have any aspect ratio, i.e. length to width ratio.

Crystallisation agents for the synthesis of cubic boron nitride are well known in the art. Examples of such crystallisation agents are alkali metal elements such as lithium and alloys containing these elements, and the nitrides and boron nitrides of these elements. Other suitable crystallisation agents for the synthesis of cubic boron nitride are alkaline earth elements, such as calcium and magnesium, alloys of alkaline earth elements, and the nitrides and boron nitrides of these elements. Further examples of suitable crystallisation agents are alkali and alkaline earth fluoronitrides, water, hydrogen chloride, borazine, hydrazine, boranes and a selection of organic compounds.

The source of boron and nitrogen and the growth centre particles are brought into contact with the crystallisation agent to create a reaction mass. Generally, the source of boron and nitrogen and the growth centre particles will be mixed with the crystallisation agent in particulate form. There must be sufficient boron and nitrogen source to create a supersaturation in the crystallisation agent or react to form any intermediate compound and provide for growth of the cubic boron nitride crystal clusters to the desired size.

Crystallisation and crystal structure modifiers may be introduced into the reaction mass to achieve specific objectives, such as modifying the electrical, semiconducting and mechanical properties and stoichiometry of the grown crystals.

The reaction mass may be placed in a reaction capsule which is placed in the reaction zone of a high temperature/ high pressure apparatus and the contents then subjected to the desired elevated conditions of temperature and pressure.

The source of boron and nitrogen reacts, dissolves or decomposes and the species migrate to the surface of the growth centre particle and precipitate or grow thereon. The constituent crystals of the resultant cubic boron nitride clusters will have a morphology and predominance of single crystals or crystallographic twins depending on the saturation-time profile utilised, as well as the temperature and pressure conditions, the chemical composition of the crystallisation agent, and the crystallographic structure of the constituent particles of the growth centre particles.

The conditions of elevated temperature and pressure which are used in the method may be those under which cubic boron nitride is thermodynamically stable. These conditions are well known in the art. Generally, the elevated temperature will be in the range 1200 to 2200° C., and the elevated pressure will be in the range 4 to 8 GPa. These conditions of elevated temperature and elevated pressure are maintained for sufficient time to allow the cubic boron nitride cluster to grow to the desired size. The time will be generally greater than 10 minutes and can be several hours.

It is also possible to produce cubic boron nitride growth under conditions which are outside the region of thermodynamic stability of cubic boron nitride. Conditions of temperature and pressure outside the region of thermodynamic stability of cubic boron nitride can be used if the Ostwald rule dominates the growth process rather than the Ostwald-Volmer rule (see S Bohr, R Haubner and B Lux Diamond and Related materials volume 4, pages 714–719, 1995) —"According to the Ostwald rule, if energy is withdrawn from a system with several energy states, the system will not reach the stable ground state directly, but instead will gradually pass through all intermediate stages. In addition, according to the Ostwald-Volmer rule, the less dense phase is formed (nucleated) first. Where the two rules would appear to contradict each other, the Ostwald-Volmer rule has priority over the Ostwald rule." In the case of cubic boron nitride crystal growth outside its region of thermodynamic stability, the Ostwald-Volmer rule can be suppressed by, for example, the application of pressure, thus allowing the growth of cubic boron nitride on pre-existing cubic boron nitride particles, provided hexagonal boron nitride crystals are substantially absent.

Isothermal and isobaric conditions are preferred in the method of this invention. However, other methods of generating conditions for cubic boron nitride crystal growth such as the temperature gradient method and size dependent supersaturation, may be used.

Recovery of the cubic boron nitride clusters from the reaction mass may be carried out by methods well known in the art, e.g. by hydrolysing the crystallisation agent using water, or any other suitable method depending upon the crystallisation agent used.

The invention will be illustrated by the following examples.

EXAMPLE 1

Figure 1B:
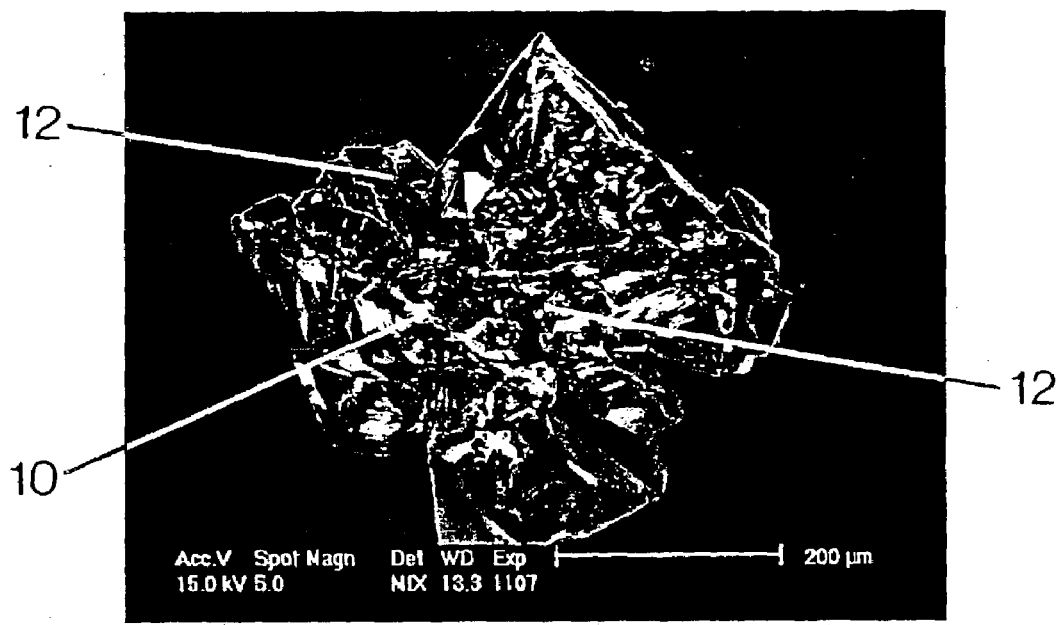
FIG. 1b is a view of the same fractured cubic boron nitride cluster as in FIG. 1a seen as a mixed secondary electron and cathodoluminescence image at a magnification of about ×135. The picture shows the growth centre to the centre left of the cluster.
Figure 2:
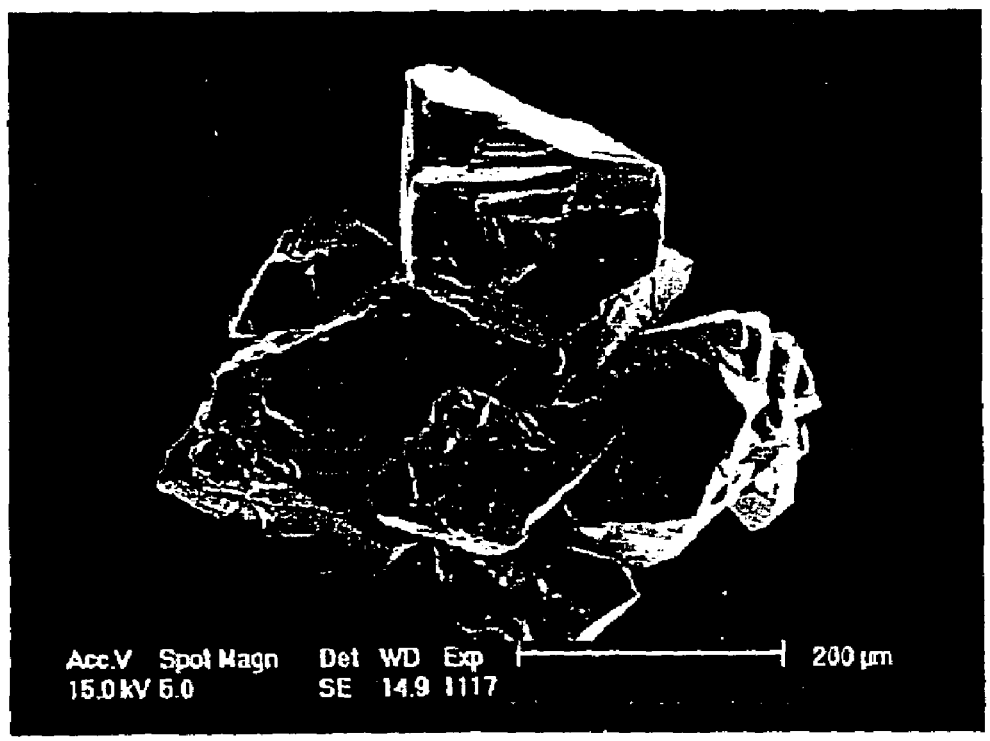
FIG. 2 is a secondary electron micrograph (magnification of about ×135) of the same cluster as shown in FIG. 1 viewed from the reverse side.

A mixture was made of lithium boron nitride and hexagonal boron nitride, and a small quantity of self-bonded cubic boron nitride particles, 44 to 74 microns. The mixture was compacted into a cylinder by isostatic compaction and machined to a size so that it fitted into the reaction capsule of a high pressure high temperature apparatus. The reaction capsule was raised to conditions of about 1500° C. and 5.1 GPa. These conditions were maintained for a period of 35 minutes. The reaction capsule was returned to normal pressure and temperature and the contents of the reaction mass removed from the reaction capsule. The reaction mass was hydrolysed with hot water and then fused with sodium hydroxide. The crystals recovered after this treatment were in the form of clusters as shown in FIGS. 1 and 2. The clusters were amber in colour, averaged about 350 microns in overall diameter and comprised 20 to 40 constituent crystals each up to about 200 microns across. The clusters comprised a core 10 and an overgrowth region 12—see FIG. 1*b*. The overgrown region 12 consists of a number of crystallites which have a cross-sectional area which increases as the distance of the crystallite from the core increases.

EXAMPLE 2

Growth centre particles were made by compacting a mass of cubic boron nitride powder with an average particle size of 3 microns, and crushing and grading the compact to provide particles with a size range of 45 to 75 microns. A quantity of these growth centre particles was mixed with hexagonal boron nitride and a lithium nitride as crystallisation agent. The mixture was then heat treated in the manner described in Example 1. The recovered cubic boron nitride clusters were generally of the form shown in FIGS. 1 and 2.

EXAMPLE 3

A quantity of the growth centre particles of Example 2 were mixed with a 9:1 mixture of hexagonal boron nitride and magnesium. The mixture was compacted and shaped to form a reaction mass, fitted into a reaction capsule and raised to conditions of about 1350° C. and about 4,4 GPa. These conditions were maintained for about 30 minutes. After recovery, the cubic boron nitride clusters were found to be of the same general form shown in FIGS. 1 and 2. The clusters had an average size of about 100 microns and comprised 15 to 30 crystals at the cluster surface.

What is claimed is:

1. A cubic boron nitride cluster comprising a core and an overgrown region containing a plurality of cubic boron nitride crystallites extending outwards from the core, the majority of the crystallites having a cross-sectional area which increases as the distance of the crystallite from the core increases.

2. A cubic boron nitride cluster according to claim 1 wherein at least 80% of the crystallites have a cross-sectional area which increases as the distance of the crystallite from the core increases.

3. A cubic boron nitride cluster according to claim 1 which is substantially free of a crystallisation agent for the synthesis of cubic boron nitride.

4. A cubic boron nitride cluster according to claim 1 wherein the crystallites are substantially faceted.

5. A cubic boron nitride cluster according to claim 1 wherein the core comprises a bonded mass of constituent cubic boron nitride particles.

6. A method of producing a plurality of cubic boron nitride clusters includes the steps of providing a source of boron and nitrogen, providing a plurality of growth centre particles, each growth centre particle comprising a bonded mass of constituent particles, producing a reaction mass by bridging the source of boron and nitrogen and growth centre particles into contact with a crystallisation agent, subjecting the reaction mass to conditions of elevated temperature and pressure suitable for crystal growth, allowing sufficient time for crystal growth to occur and recovering the cubic boron nitride crystal clusters from the reaction mass.

7. A method according to claim 6 wherein the source of boron and nitrogen is hexagonal boron nitride, other non-cubic form of boron nitride, a mixture of two or more such boron nitrides or a mixture of a nitride and a boride.

8. A method according to claim 6 wherein the constituent particles of the growth centre particles are cubic boron nitride.

9. A method according to claim 8 wherein the cubic boron nitride for the growth centre particles is selected from the group consisting of CVD cubic boron nitride, shock wave produced cubic boron nitride, HPHT cubic boron nitride, polycrystalline cubic boron nitride and a combination of two or more thereof.

10. A method according to claim 6 wherein the constituent particles have a size of less than 200 microns.

11. A method according to claim 6 wherein the growth centre particles have a size of less than 1 mm.

12. A method according to claim 6 wherein the bonding in the growth centre particles is achieved by self-bonding between constituent particles.

13. A method according to claim 6 wherein bonding between constituent particles in the growth centre particles is achieved by means of a bonding agent.

14. A method according to claim 6 wherein the elevated temperature is in the range 1200 to 2200° C. and the elevated pressure is in the range 4 to 8 GPa.

* * * * *